Feb. 20, 1940. A. W. VANCE 2,190,743
MEASURING SYSTEM
Filed April 7, 1936 2 Sheets-Sheet 1
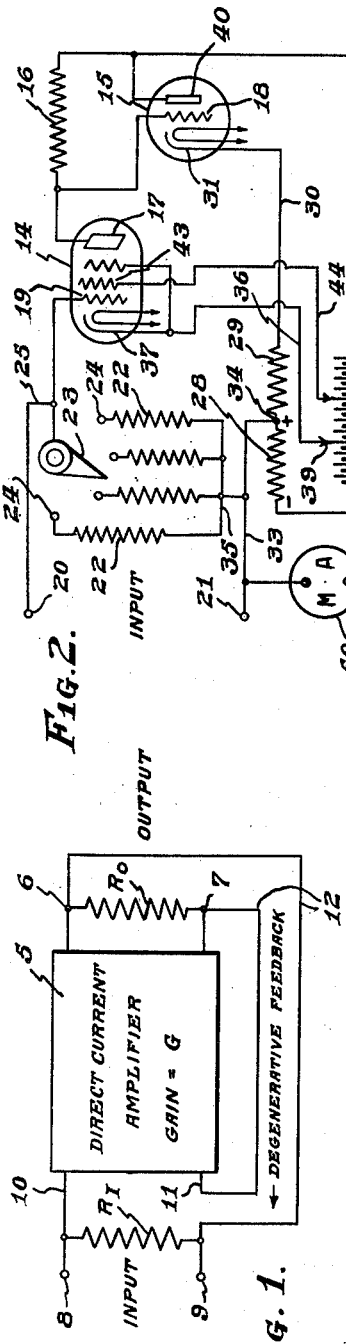
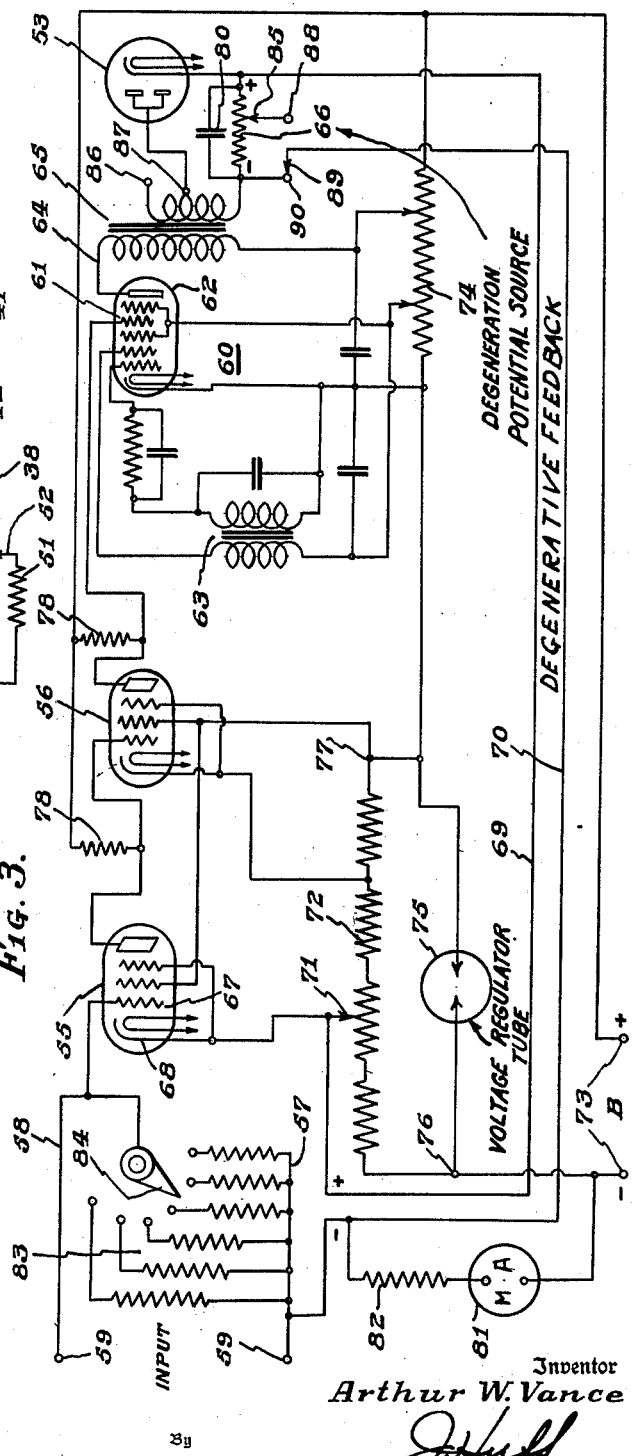
Inventor
Arthur W. Vance
By
Attorney

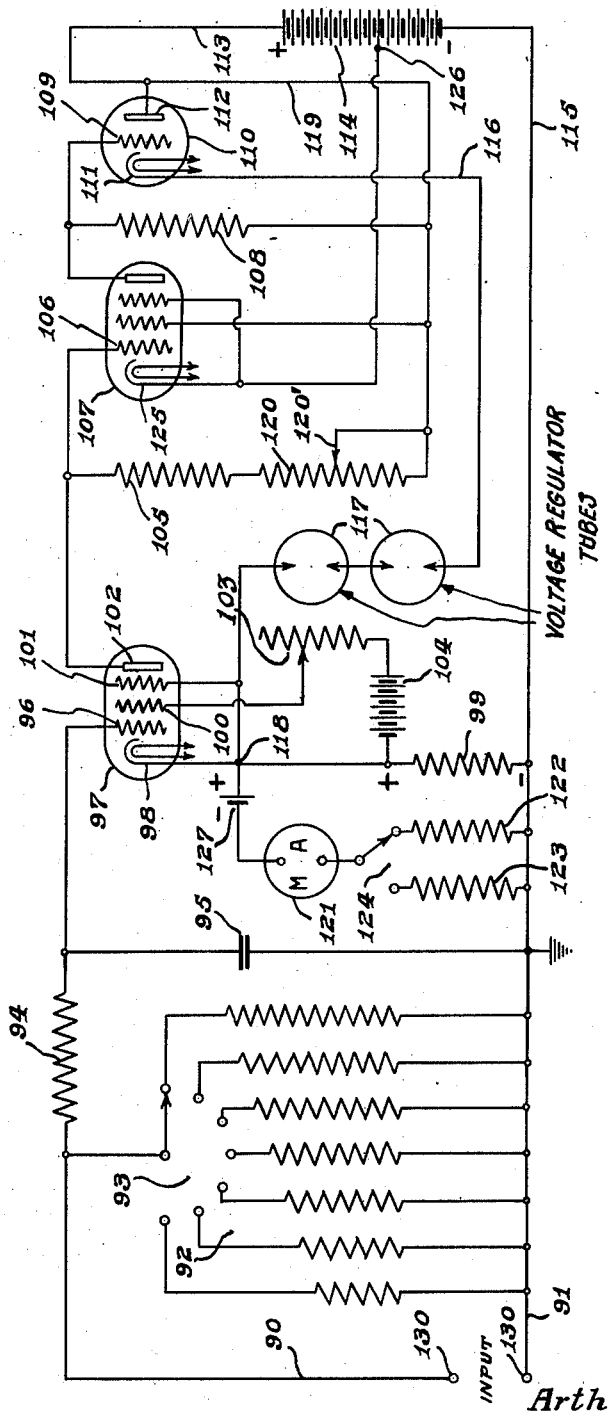

UNITED STATES PATENT OFFICE 2,190,743

MEASURING SYSTEM

Arthur W. Vance, Haddonfield, N. J., assignor to Radio Corporation of America, a corporation of Delaware Application April 7, 1936, Serial No. 73,123

21 Claims. (Cl. 171—95)

The present invention relates to direct current amplifiers, and has for its object to provide an amplifier of the direct current type which may be calibrated to measure relatively small electric currents and voltages accurately.

It is also an object of the present invention, to provide a calibrated direct current amplifier of the type referred to, which is free from drift, and the calibration of which is independent of tube characteristics, whereby it may be used to measure accurately relatively small currents, such, for example, as currents in the microampere range.

It is a further object of the invention to provide a calibrated direct current amplifier which may be utilized effectively as a high impedance voltmeter, the accuracy of which does not vary with change in tube characteristics.

Conventional direct current amplifiers are noted for their instability and are subject to drift because of tube changes and voltage supply changes, and the gain is directly dependent on characteristics of the tubes used in the amplifier. These limitations make their use as measuring instruments very critical and require constant calibration if accuracy is to be obtained and maintained.

However, it has been found that a direct current amplifier, the voltage output of which is applied to the input circuit to provide negative regeneration, may be calibrated and utilized in current and voltage measurements by taking advantage of the power of this device to resist change in voltage, which is limited by what is called the gain around the closed loop and by the saturation limits of the tubes.

Therefore, it is also a further object of the present invention, to provide a calibrated direct current amplifier, in which the use of degeneration permits the drift and the effect of tube characteristics on calibration or gain to be reduced to a small second order effect.

It is a still further object of the present invention, to provide an improved electrical measuring device or system wherein relatively small currents may be measured and which employs a direct current amplifier having the output circuit thereof degeneratively coupled to the input circuit.

It is also a further object of the invention to provide an improved electrical measuring device of the above type, the operating range of which may be adjusted to cover a relatively wide range of currents or voltages.

The invention will, however, be better understood from the following description when considered in connection with the accompanying drawings and its scope will be pointed out in the appended claims.

In the drawings,

Fig. 1 is a schematic circuit diagram of a direct current amplifier adapted for operation in accordance with the invention, Fig. 2 is a further schematic circuit diagram of an electrical measuring system embodying the invention, and Figs. 3 and 4 are similar schematic circuit diagrams of further modifications of the invention.

Referring to Fig. 1, a direct current amplifier represented at 5, is provided with voltage output terminals 6 and 7 which are connected with the input circuit, represented by input terminals 8 and 9 and input leads 10 and 11 for the amplifier, through a feed-back connection represented by leads 12. In this feed-back connection, the terminal 7 is connected to the input lead 11 and the terminal 6 is connected with the input terminal 9 the terminal 8 being connected with the input lead 10, as shown, whereby the output circuit of the amplifier is connected in series with the input circuit.

The polarity of the connection is such as to produce degeneration when signals are applied to the terminals 8 and 9 and the voltage impressed across the input circuit is opposed by the voltage feed-back from the output circuit to such an extent that the actual voltage change produced on the input leads 10 and 11 is equal to (1) $$V_c = \frac{V \text{ input}}{1+G}$$

in which $V_c$ is the actual voltage change produced on the grid of the input tube of the amplifier 5 or on the input circuit, V input is the actual input applied voltage at the terminals 8 and 9, and G is the normal gain of the amplifier without the feed-back connection.

Thus any voltage imposed upon the input terminals 8 and 9, is matched by the output to an accuracy of $$\frac{1}{1+G}$$

Thus if G=100, then the output matches the input to 1 part in 101. By making G very large, the output voltage may be made negligibly different from the input voltage.

Similarly, it may be pointed out that the amplifier resists any change in its equilibrium position by 1+G. Thus if the tube characteristic should change in any way, the resulting change in voltage at any point in the amplifier, would be that voltage change which would have occurred if the amplifier were not connected to feed-back, divided by 1+G. The same reasoning applies to changes in supply voltages, etc. Thus it can be seen that undesirable characteristics are, in effect, as hereinbefore pointed out, divided by 1+G. It will be seen further that if the gain G is large between the input leads 10, 11 and the output terminals 6, 7, a voltage gain of substantially unity may be obtained.

The current gain, however, is only unity when $R_I = R_O$, i. e., when the resistance or impedance of the input circuit equals the resistance or impedance of the output circuit. If $R_I$ is made many times the value of $R_O$, a large current amplification may be obtained. The current gain is equal to $R_I/R_O$. It can be seen, therefore, that the calibration of this system depends upon the input and output impedances $R_I$ and $R_O$ and that tube characteristic changes, only slightly affect the accuracy in calibration. The amplifier, being a direct current amplifier, will permit a definite calibration and equilibrium condition which will resist any change by a factor of 1+G. This facilitates holding zero points in measuring direct currents.

A measure of the input current or voltage may be obtained by measuring the output voltage or current in connection with the output impedance $R_O$ and its relation to the input impedance $R_I$, as will be seen by referring now to Fig. 2, in which a degeneratively connected feed-back direct-current amplifier is arranged in accordance with the invention, to provide a calibrated measuring instrument adapted to measure relatively small currents and voltage. It is particularly adapted to measure currents in the magnitude of microamperes and includes a high-mu pentode tube 14 which is directly coupled to a high-mu triode or other suitable high gain amplifier tube 15, through a common coupling resistor 16 in circuit with the anode 17 of the amplifier 14 and the control grid 18 of the amplifier 15. The control grid and anode are therefore directly coupled.

The control grid 19 of the pentode amplifier 14 is connected with an input circuit having input terminals 20 and 21 across which are connected a resistor or input impedance bank comprising a plurality of shunt resistors or impedances 22, individually selectable by means of a selector switch comprising an arm 23 and tap connections 24 for each of the resistors or impedances 22, and an input lead 25.

The resistors bank represents the input resistor or impedance $R_I$ in Fig. 1 and may be adjusted to provide differing resistance or impedance values which preferably are multiples of 10 to facilitate calibration. For example, the resistors 22 may have values from left to right, as shown in the drawings, of 2, .2, .02, and .002 megohms.

The output resistor or impedance of the direct current amplifier is connected in the cathode lead of the amplifier 15, and is provided at 28 and 29 in a cathode lead 30 between the cathode 31 and a negative supply terminal 32. This is arranged to be connected in series with and opposing in polarity the input circuit between the terminals 20 and 21, through a connection lead 33 between the terminal 21 and a tap 34 between the resistors 28 and 29. This lead also provides the low potential or common circuit lead for the resistor or impedance bank.

The amplifier circuit further includes a connection 36 for the cathode 37 of the first stage amplifier 14 with the potential supply means 38, at a suitable tap point 39 to apply a positive potential to the cathode with respect to the control grid 19 which is connected with the terminal 32 through the resistor section 28.

The anode 40 of the output amplifier 15 and the coupling resistor 16 are connected through a positive supply lead 41 with a positive terminal 42 of the supply means 38, and the screen grid 43 of the pentode 14 is supplied from the source 38 through the lead 44 at a suitable positive operating potential.

In the present example, the high gain amplifier device 14 is preferably of the high-mu pentode type and may be provided by an RCA 57 type tube, and because of the relatively high output impedance the amplifier device 15 is also preferably of high-mu type and may be a triode. It has been found that a tube known as the RCA 2A6, in which the diode electrodes therein are not used, may be suitable as having a desirable high-mu characteristic. For that reason the diodes are not shown in the drawings. Other suitable tubes may, however, be used to provide the same or similar operating characteristics suitable for the direct current calibrated amplifier, which have a relatively high gain and a relatively wide range of output current values, without saturation.

In the present example, the resistors 28 and 29 may have a value of 75,000 ohms and 45,000 ohms, respectively, with a coupling resistor 16 of one-half megohm. The potential source 38 may provide 200 volts and with the circuit shown the terminal 34 connected with the control grid 19 is at a positive potential of 50 volts. In order, therefore, that the control grid may have an initial negative potential with respect to its cathode 37, the cathode is connected through the tap connection 39 with a positive point on the potential source 38 of 55 volts, whereby the initial bias on the grid 19 is substantially 5 volt negative.

Since the resistor 28 and the negative terminal 32 of the potential supply source are connected together, and since the one side of the input circuit, such as the terminal 21 and lead 33, are connected with one terminal 34 on the output resistor while the cathode 37 is connected with the low potential terminal through the supply source 38, the output circuit of the amplifier is connected in series with the input circuit and in a degenerative manner. This will be seen from a consideration of the operation, which is as follows:

If a negative potential is applied at the terminal 20 with respect to the terminal 21, an increase in the negative bias on the grid 19 will cause a reduction in the anode current through the coupling resistor 16, which will result in an increase in the positive potential available at the control grid 18, making that grid more positive and causing an increase in the anode current flow from the anode 40 through the cathode 31 and the resistors 28 and 29 from the potential supply source 38. The polarity of the terminal 34 is indicated, and since the negative terminal of the resistor section 28 in series with the input circuit is connected with the cathode 37, it is seen that the positive potential increase resulting from increased current flow through the resistor 28 will be applied in opposition to the increase in negative potential.

With the arrangement shown, the opposing voltage substantially equals the input voltage in any case, and the voltage change in the input circuit is in accordance with Equation 1 and may be in the order of $\frac{1}{1,000}$ or $\frac{1}{10,000}$ volts, depending upon the gain of the amplifier provided between the input and output impedances. Since the input voltages and output voltages are substantially equal, by an amount dependent upon the gain of the amplifier and more accurate in proportion to an increase in the gain, the amplifier shown may be calibrated to read voltage or current with a great degree of accuracy and independently of the tube characteristics. An amplifier of the type shown "locks" in equilibrium at a predetermined voltage on the grid of the first amplifier stage and resists any change in potential at the input by an exact and opposite amount, differing therefrom by a negligible quantity represented by the factor $$\frac{1}{1+G}$$

With the present system, wherein the amplifier device 14 is initially biased at 5 volts negative and the screen grid is operated at substantially 100 volts positive with respect to its cathode, the circuit locks itself in equilibrium at the point representing about 5 volts negative on the grid of tube 14.

In the present example, the amplifier is adapted for measuring direct current of relatively small value in the range of microamperes. The currents to be measured are passed through the input circuit across one of a bank of resistors or impedances represented by the resistors 22, as selected by the switch means 23—24. The resistor used depends upon the measurement range desired.

A measuring device responsive to current, such as a voltmeter or ammeter may be connected with the output resistor section 28, and in the present example is provided by a milliammeter 50 having one terminal connected with the lead 33 and the terminal 34 and having the other terminal connected through a series resistor 51 with the negative terminal of the resistor 28. In order that the meter reading may be zero or adjusted to zero, the resistor 51 is connected to a point 52 on the source 38, which is at the same potential as the terminal 34 or at a point approximately 50 volts positive.

Any suitable meter and resistor may be used which will have a predetermined and desired impedance or resistance relation to that of the resistors in the input bank. A milliammeter having a full scale range of .1 milliampere has been found to be suitable and is indicated in the present example in series with a 20,000 ohm resistor at 51, thus producing a 2 volt full scale voltmeter across the output resistor section 28. If the contact 52 is adjusted for zero reading, and a potential is applied to the input circuit the voltage across the output resistor 28 will change by the substantially same amount, or $$V_c = \frac{V \text{ input}}{1+G}$$

and will be read on the meter 50.

If a current gain from the input circuit to the meter through the amplifier is 100 and if a .2 megohm input resistor is used, full scale deflection of the meter will read 10 microamperes and the current gain will be 10; likewise, if the .02 megohm resistor is used in the input circuit, the full scale range of the meter 50 is 100 microamperes and the current gain is unity. If the .002 megohm resistor (2,000) ohms is used, the current gain is .1 and the range is 1 milliampere.

If a 2 megohm input resistor is used, it will be seen that 1 microampere will produce 2 volts across the input circuit. The potential drop produced by 1 microampere flowing through 2 megohms is the same as the potential drop produced by .2 milliampere flowing through 20,000 ohms and, since the direct current amplifier functions to produce the same voltage at the output as at the input, differing therefrom only by the negligibly small amount represented by Equation 1, then the meter 50 may be calibrated to read in microamperes, with a full scale deflection reading 1 microampere. Therefore, it will be seen that by increasing the resistance of the input resistor, the output meter may be caused to read correspondingly lower values of current accurately within the readable portion of the scale thereof.

It will also be seen that the instrument may be used as a voltmeter having a 2 volt scale, in the present example, and if the selector switch is adjusted for the 2 megohm input resistor, for example, the meter will have an input resistance of 1 megohm per volt, which is highly desirable in connection with measurements of voltage sources of high impedance or low current output.

Referring now to Fig. 3, a high gain amplifier is shown which permits the use of any suitable form of power supply means, such as rectified alternating current supply without appreciable drift because of changes in supply voltage. In this amplifier, a pair of high-mu pentode tubes 55 and 56 are connected in cascade as a direct coupled, direct current amplifier between an input circuit represented by the input leads 57 and 58 connected with input terminals 59, and a controllable oscillator 60, the output of which is rectified by a rectifier 53 and applied to the input circuit through degenerative coupling.

The two-stage, direct current amplifier is connected to the control grid 61 of an oscillator-modulator or mixer tube 62 in the oscillator, which may be of the RCA–6A8 penta grid converter type. The oscillator portion of the tube 62 may be operated at 1,000 cycles, for example, by oscillator coupling through an iron cored transformer 63 as shown. The 1,000 cycle current is modulated by the output of the direct current amplifier and appears in the plate output circuit 64 from which it is transformed to a lower impedance through a step-down transformer 65 and rectified by the rectifier 53. The rectifier may be of the RCA–6H6 diode type.

The rectified output from the oscillator as provided by the diode rectifier 53 is applied to the diode output resistor 66, and the potential therefrom is fed back in series with the input resistor of the first stage of the direct current amplifier, in such polarity as to produce degeneration.

As in the preceding example, the input or control grid 67 is connected with the high potential side 58 of the input circuit while the cathode 68 is connected to the low potential side thereof 57 through the feed-back connection provided by the leads 69 and 70 in connection with the output resistor 66. The cathode is also connected to a negative tap 71 on a potential supply source represented by a bleeder resistor 72, forming part of the potential supply system between terminals 73 and including the resistor 74. A voltage regulator tube 75 is provided across the resistor section 72 between the terminals 76 and 77.

In the system shown, the coupling resistors for the direct current amplifier, indicated at 78, may be of the order of one megohm and for a 400 volt supply between the terminals 73 the resistor 74 may have a value of 12,000 ohms, while the resistor sections of the resistor 72 may have values of 100 ohms in the two left hand sections and approximately 4,000 ohms in the two sections to the right thereof as viewed in the drawings. The glow tube 75 may be of the type known as an RCA 874.

It will be noted that the output resistor 66 for the diode rectifier is provided with a shunt bypass capacitor 80. This is preferably of relatively high capacity substantially 20 microfarads, for example. This stabilizes the output voltage and tends to smooth it for application to the input circuit while the glow tube 75 provides substantially a fixed voltage drop for reducing line voltage changes and preventing inter-action between the various tubes. The cathode connections for the direct current amplifier are spaced along the resistor 72 to provide proper biasing potentials.

An output meter indicated at 81, is connected as a 1 volt, 10,000 ohm meter across the output of the rectifier and in series with a portion of the resistor section 72. This series connection is effected by connecting the meter 81 in series with a resistor 82 of substantially 10,000 ohms resistance between the terminal 76 of the bleeder resistor 72 and the low potential side of the input circuit, represented by the lead 57, to which is also connected the feed-back lead 70.

The normal output of the rectifier is 4 volts with the oscillator 60 operating normally and this is available on the control grid 67. In order to balance out this voltage to obtain a zero reading on the output meter 81, the tap 71 is movable to provide a bucking voltage, since the point 71 is at a more positive potential than the terminal 76 and this potential is adjusted to exactly equal the normal output potential from the oscillator through the rectifier 61 at the output resistor 66.

The input circuit is provided with a bank of resistors 83 which may be connected, each selectively across the input circuit by a selector switch 84, as in the preceding embodiment of the invention, the resistors in the bank being of differing values, preferably differing by some multiple of 10 and having a definite relation to the output resistor 82. In the present example, the resistors 83 from left to right may be considered to have values of 5 megohms, 1 megohm, and 10,000, 1,000, 100, and 10 ohms, respectively.

With this arrangement, as current flows in the input circuit from the input terminals, through one of said resistors, the negative bias on the control grid 67 may be increased by the amount of the voltage present across the resistor, and the grid of the succeeding tube 56, therefore, is rendered more positive. The control grid 61 of the oscillator becomes more negative, whereby the oscillator output is reduced, and the voltage existing across the rectifier output circuit is thereby reduced by an equal amount.

The voltage change on the input circuit is substantially zero or equal to the voltage expressed by the Equation 1. In this case, the normal gain of the amplifier is relatively high and the amplification may be of the order of several thousand, whereby the difference between the input and the output voltages is substantially negligible. However, the high gain is permissible without the use of relatively large bucking voltages by reason of the use of the modulator or modulated oscillator stage 60 followed by the rectifier stage.

Therefore, with the arrangement shown, when a 10,000 ohm output resistor 82 is used in conjunction with a .1 milliampere meter 81, a voltage drop of 1 volt provides a full scale deflection of the meter and, accordingly, because of the degenerative feed back arrangement, the application of 1 volt to the input circuit will produce substantially the same opposing potential in the output circuit to be measured by the meter.

If the one volt applied to the input circuit is applied across the one megohm resistor, the current through the resistor will be one microampere and the current in the output circuit which will produce one volt drop through 10,000 ohms is .1 milliampere. The current gain therefore, as in the preceding embodiment of the invention is 100, which is the ratio of the input resistor to the output resistor, and a full scale deflection of the meter indicates a total input current of 1 microampere.

If an input current of .1 microampere is to be read at full scale, a resistor of 10 megohms is used in the input circuit. The current gain therefor is in accordance with the equation hereinbefore stated and equal to $$\frac{R_I}{R_O}$$

In the present example, with a range of 5 megohms to 10 ohms in the input circuit, the full scale reading of the meter lies between .2 microampere and 100 milliamperes. It is obvious that this provides a wide range of operation to measure small currents accurately. Other ranges of operation may be provided with a proper choice of the resistors in the control bank in the input circuit.

The rectifier output resistor 66 may be provided with a tap, indicated at 85, and the transformer 65 may be provided with a higher voltage secondary tap indicated at 86, to which the rectifier may be connected instead of being connected to the tap indicated at 87. With the tap 86 in use, the transformer ratio is such that more output potential is applied to the rectifier, and if the lead 70 is now connected to the tap 85 through a terminal 88, by switching the connection indicated at 89 from the terminal 90 to the terminal 88 a certain percentage, for example 1/100, of the rectifier output may be fed back to the input circuit.

Under this condition, the voltage across the rectifier may be made 100 times that across the input and an amplifier is provided which has an accurate voltage gain of 100. Such an amplifier may be useful where an exact voltage gain is desirable. This system may be provided in connection with any locked-in direct current amplifier system where the stabilized degenerative feed back connection is changed to apply to the input circuit a percentage of the available output voltage representing a reciprocal of the gain desired to be held in the amplifier.

The calibrated amplifier shown and described in connection with Fig. 3 has the advantage of high gain, whereby the accuracy is greatly increased, while at the same time the bucking voltages required are relatively low because of the use of a controlled oscillation or potential source. The output may be controlled by the direct current amplifier to provide a rectified current and potential drop, proportional to the input potential and degeneratively applied to the input circuit in opposition to the input potential in a closed direct current amplifier loop. Furthermore, because of the high gain, the amplifier is substantially and more fully independent of the variations in tube characteristics and in potential variations of the supply source.

Referring now to Fig. 4, a microammeter is shown as comprising a relatively high gain direct current amplifier, the output potential from which is taken in series with the cathode circuit and in which the cathode of the output or control amplifier is raised above ground or the negative supply connection by means of impedance devices having a low alternating current impedance, to reduce degeneration within the amplifier itself, while providing means for direct connection between amplifier stages, as is desirable.

The input circuit, indicated by a high potential lead 90 and a ground lead 91, is provided with a bank of shunt resistors or impedance devices 92 having differing and related impedance or resistance values as described in connection with preceding embodiments of the invention, and having a selector means 93 for connecting them individually in shunt across the input circuit.

The input circuit is connected through a series filter resistor 94 provided with a shunt bypass filter capacitor 95, with the input or control grid 96 of a first stage high gain amplifier device 97, the cathode 98 of which is connected with the ground lead 91 through an output resistor 99. The device 97 is of the high-mu pentode type having a screen grid 100, a suppressor grid 101 and an output anode 102. The screen grid potential is controlled by a variable resistor 103 in series with a potential source represented by a battery 104. The output anode 102 is connected through an output coupling resistor 105 with the control grid 106 of a similar second stage.

The anode 112 is connected directly with a positive supply lead 113 in connection with a potential source 114, the negative terminal of which is connected through a lead 115 with the ground lead 91.

The cathode 111 of the output stage is connected through a lead 116 and potential drop producing means represented by two series connected glow discharge devices such as neon tubes 117, with the cathode 98 of the input amplifier and with the output resistor 99 at an output terminal 118. The purpose of the devices 117 is to provide a relatively high drop in potential, of substantially 100 volts for example, and of substantially constant value, to raise the cathode of the output device 111 sufficiently high above ground to permit the direct connection of its control grid 109 with the output anode of the preceding amplifier stage comprising the device 107.

The potential supplied to the resistor 108 is taken through a positive supply lead 119 which is connected also with the anode coupling resistor 105 through a variable resistor 120 having a movable control tap 120' for controlling the current flow therethrough, and the potential on the control grid 106.

The output meter is connected between the terminal 118 and the ground lead 91 across the output resistor 99, which is in the cathode circuit of both the input and the output tubes. The output meter connection is a series connection comprising the meter or milliammeter 121 and a suitable number of series resistors 122 and 123 for providing differing output ratios and selectable by means of a selector switch 124, whereby the resistor 122 or the resistor 123 may be connected in series with the meter 121 across the output resistor 99.

The stabilized operating characteristic of the circuit shown is such that with 180 volts available at 113, for example, and with the cathode 125 of the second stage amplifier connected to a point 126 on the supply source 114 substantially 67 volts above ground, a stabilized or locked-in voltage of 1.5 volts exists across the output resistor 99.

This initial bias potential is applied to the control grid 96 through the input circuit resistor bank 92 and is also applied to the output meter circuit. Accordingly, a bucking or opposing potential is required to provide a zero reading on the meter, and this is provided by a small battery comprising, for example, one cell as indicated at 127 of 1.5 volts, acting in opposition to the potential in the output resistor 99.

In order that the fixed potential provided by a battery or cell 127 may be exactly balanced, the screen grid potential of the first stage amplifier may be adjusted by the control 103, and the anode current and therefore the voltage on the control grid of the second stage amplifier, may be adjusted by the control device 120'. A decrease in the plate resistor 120 makes it necessary to cause the grid 96 to be made more positive in order to obtain the same voltage at the plate 102 and hence on the grid 106. This action decreases the voltage across the load resistor 99.

If the screen grid voltage is raised by means of the device 103, the control grid 96 must become more negative to obtain the same voltage at the plate 102 and on the grid 106. Therefore, these adjustments permit changing the initial voltage in the output resistor 99 to balance the voltage at 127 exactly, to provide a desired zero reading of the meter.

In the present example, the amplifier tubes 97 and 107 may be of the high-mu pentode type, as provided by the Acorn tubes RCA-954 and the triode device 110 may be a similar Acorn tube of the type known as the RCA-955. The coupling resistor 105 may have a resistance of 300,000 ohms while the coupling resistor 108 may have a resistance of 500,000 ohms.

The input resistors 92 may have values of multiples of 10, for example,—100, 1,000, 10,000, and 100,000 ohms; 1, 2, and 10 megohms, in the order named from left to right, as viewed in the drawings, and the output resistors may have a resistance of 9,730 ohms at 123 and 730 ohms at 122, with a meter resistance of 270 ohms, whereby a total of 10,000 and 1,000 ohms, respectively, are provided in connection with the resistors 123 and 122 across the output resistor 99, which may have a resistance of 1,000 ohms. Because of this low output resistance, a low mu tube may be used at 110.

The output resistor is degeneratively connected to the input circuit and in series therewith, between the cathode 98 and the control grid 96 of the input amplifier stage, as will be seen from a consideration of the operation as follows:

If a negative potential is provided in the input circuit and applied to the control grid 96 the anode current is reduced through the resistor 105, causing the control grid 106 to become more positive and the drop in the output resistor 108 to increase, thereby causing the control grid 109 to become more negative and thereby reducing the anode current from the source 114 through the device 110 and the regulating tubes 117, thence back to the supply source 114, through the supply lead 115 and the output resistor 99. The reduction in potential drop through the resistor 99 causes the increase in negative potential on the input grid to be opposed thereby, and a condition of equilibrium is again established in the closed loop provided by the degeneratively connected feed-back.

With the selector switch 93 connected as shown, a current applied through the input terminals 130 provided in connection with the input leads 90 and 91, and with a milliammeter at 121 having a full scale deflection with .1 milliampere flow, .1 volt applied to the input circuit will provide, through the 10 megohms across the input circuit, a current flow of .01 microampere. A potential of .1 volt on the input circuit will produce a corresponding and opposing output voltage of .1 volt across the total resistance of 1,000 ohms when the switch 124 is in the position shown, and a flow of current through the milliammeter of .1 milliampere.

The milliammeter may therefore be calibrated to read .01 microampere for a full scale deflection and the accuracy of the reading will be in accordance with the equation $$(2) \quad V_c = \frac{1}{1+G} = \frac{1}{10,001}$$

when the gain in the amplifier shown in the present example is substantially 10,000. It will be seen that this is extremely accurate when it is considered that the current being read is in the order of a .00000001 ampere or less, down to the limit of the lowermost accurate scale reading of the output meter which ordinarily, may permit readings to be taken accurately down to .001 microampere.

By operating the switch 124 to include the resistor 123 in circuit with the output meter, an output resistance of 10,000 ohms is provided and a full scale reading of .1 microampere. In any case, the current gain may be found by dividing the output resistance into the input resistance and with this current ratio and with constant voltage at the input and output resistors, the current range may be determined. For example, the following full scale readings of the output meter 121 are provided by the input resistors referred to:

| Input resistance (ohms) | 100 | 1,000 | 10,000 | 100,000 |
|---|---|---|---|---|
| Current range full scale | 1.0 m. a. | .1 m. a. | .01 m. a. | 1 m. a. |

| Input resistance (megohms) | 1 | 2 | 10 |
|---|---|---|---|
| Current range full scale (microamperes) | .1 | .05 | .01 |

In other words, the measuring range of the instrument shown may include full scale readings from .01 microampere to 1 milliampere with the output switch adjusted for 1,000 ohms output, and with the switch adjusted for 10,000 ohms output, a full scale reading may be made of any current from .1 microampere to 10 milliamperes and with an accuracy dependent upon the gain of the amplifier which it would have if the feedback connection were disconnected.

The advantage of a low output resistance lies in the fact that a large current must flow in it and the accuracy of the reading is increased for the reason that slight variations of current are a small percentage of the total current. Furthermore, the current amplifier provided with a degenerative feed-back connection, renders the system independent of variations in tube characteristics and other factors which would influence the accurary of the meter. Such a system locks at a definite bias on the first direct current amplifier tube, and if a current passes through the grid resistor of the first tube, producing a potential drop, the same potential drop appears across the rectifier or output circuit to maintain equilibrium if the output circuit is degeneratively connected with the input circuit.

Such a system as shown in Fig. 4 has a further advantage as a high resistance voltmeter in that with a 10 megohm input grid resistor, for example, .1 volt across the input terminals 130 will produce .1 volt across the output circuit with an accuracy of $$\frac{1}{10,001}$$

and with an input impedance of 100 megohms per volt.

The efficiency of a calibrated amplifier of this character when used to provide an accurate microammeter or voltmeter lies in the fact that the plate impedance of a high-mu amplifier device therein may remain relatively high while the drop between the plate and cathode is reduced to a relatively low value, thereby permitting a relatively high gain with proper biasing potentials on the grid elements thereof in connection with a normal potential supply source of relatively low voltage.

It will also be noted that the grid swing on the first stage amplifier is negligible; therefore the effect of grid current on the accuracy of the device is very small compared with conventional amplifiers wherewith the full input voltage appears on the grid of the first amplifier tube.

An effective alternating current or ripple filter is desirable at some point in the amplifier and may be provided by suitable means such as by the series resistor and shunt capacitor in the input circuit of the system of Fig. 4 or by the heavy shunt diode output capacitor in the system of Fig. 3.

I claim as my invention:

1. In an electrical measuring instrument, the combination of a direct current amplifier having an input circuit and an output circuit, means for degeneratively coupling the output circuit with said input circuit whereby said amplifier is stabilized at a predetermined potential on the input circuit, means in said amplifier providing a relatively high gain therethrough in the absense of said degenerative connection, means for adjusting the ratio of the input circuit impedance to the output circuit impedance to provide a predetermined current gain through said amplifier, and a current responsive measuring device connected with the output circuit to provide a measurement of the current in said output circuit in accordance with the current gain therein.

2. A microammeter, including in combination a direct current amplifier including a plurality of high gain electric discharge devices connected in cascade relation between an input circuit and an output circuit, means providing a degenerative connection between the input circuit and the output circuit having a stabilized operating point providing an initial biasing potential on the input circuit, means for adjusting the impedance ratio of the input circuit to the output circuit whereby a predetermined current amplification is obtained, and a current responsive device of the milliammeter type connected in said output circuit to indicate the current gain as a measure of the current in the input circuit.

3. A microammeter, including in combination a direct current amplifier including a plurality of high gain electric discharge devices connected in cascade relation between an input circuit and an output circuit, means providing a degenerative connection between the input circuit and the output circuit having a stabilized operating point providing an initial biasing potential on the input circuit, means for adjusting the impedance ratio of the input circuit to the output circuit whereby a predetermined current amplification is obtained, a current responsive device of the milliammeter type connected in said output circuit to indicate the current gain as a measure of the current in the input circuit, and means for adjusting the impedance of the output circuit in predetermined relation to the impedance of the input circuit whereby the range of operation of said current responsive device is adjusted.

4. A microammeter in accordance with claim 2, further characterized by the fact that a controllable oscillator is inserted between the direct current amplifier and the output circuit in connection with and controlled by said amplifier, and that a rectifier for the oscillator output is provided in connection with the output circuit.

5. In a measuring instrument of the microammeter-voltmeter type, the combination of an electric discharge amplifier device having a control grid and cathode, an input circuit therefor connected between the control grid and the cathode thereof, means for adjusting the impedance of said input circuit, a second stage amplifier device directly connected with said first named amplifier device to provide a multi-stage direct current amplifier, said last named device being of the high-mu type, means providing a low impedance output circuit for said direct current amplifier degeneratively connected in series with said input circuit, and a current responsive measuring device connected with said output circuit for measuring the current gain in said output circuit as a measure of the current in the input circuit.

6. In a measuring instrument of the microammeter-voltmeter type, the combination of an electric discharge amplifier device having a control grid and cathode, an input circuit therefor connected between the control grid and the cathode thereof, means for adjusting the impedance of said input circuit, a second stage amplifier device directly connected with said first named amplifier device to provide a multi-stage direct current amplifier, said last named device being of the high-mu type, means providing a low impedance output circuit for said direct current amplifier degeneratively connected in series with said input circuit, and a current responsive measuring device connected with said output circuit for measuring the current gain in said output circuit as a measure of the current in the input circuit, said last named means including a milliammeter and a series resistor therefor connected in shunt relation to said output circuit and having a predetermined impedance relation to the impedance of the input circuit.

7. A measuring system in accordance with claim 6 further characterized by the fact that a controllable oscillator is connected between the direct current amplifier and the output circuit and that a rectifier is provided for rectifying the oscillator output in connection with the output circuit thereby to provide a degenerative feedback potential of predetermined amplitude for effecting a balanced condition of operation.

8. In an electrical measuring instrument, the combination with a direct current amplifier comprising a plurality of high gain electric discharge amplifier stages having a gain G, of means providing a degenerative feedback connection between the output circuit of said amplifier and the input circuit thereof, whereby a potential impressed upon the input circuit causes a potential to appear in the output circuit which differs therefrom by the amount through the feedback connection equal to $$V_c = \frac{V_I}{1+G}$$

means for adjusting the ratio of the resistance of the input to the resistance of the output circuit, and means for indicating the current gain through said amplifier in accordance with the ratio $$\frac{R_I}{R_O}$$

9. In an electrical measuring instrument, the combination with a direct current amplifier comprising a plurality of cascade connected electric discharge amplifier devices, of an input circuit for said amplifier comprising a plurality of resistor elements connectible in shunt relation thereto, means providing a selective connection for each of said resistor elements with said input circuit, means providing an output impedance for said amplifier at least a portion of which is connected in series relation with said input circuit and of such polarity that a degenerative feedback connection is provided between the input circuit and the output circuit, and a measuring device including a milliammeter and a series resistor connected in shunt relation to at least a portion of said output resistor, said measuring device having a predetermined resistance ratio with respect to the resistance of elements in said input circuit whereby said milliammeter may be calibrated to read the value of an electrical current applied to said input circuit in accordance with the ratio of the input circuit resistance to the output circuit resistance and with an accuracy dependent upon the gain of said amplifier without the feedback connection.

10. An electrical measuring instrument comprising in combination a pair of high gain amplifier devices directly connected in cascade relation to each other and an output amplifier device therefor providing a high gain direct current amplifier, one of said first named amplifier devices having a control grid and a cathode, means providing an input circuit connected between said grid and said cathode and including at least one resistor element of predetermined resistance value, an output resistor of related resistance value connected between said last named cathode and said last named resistance elements, said output amplifier device having an anode and a cathode, means for applying an operating potential between the last named anode and cathode through said output resistance, voltage drop producing means in said last named connection, and an output current indicating meter responsive to current variations and a resistor of predetermined resistance value connected in series therewith as a shunt connection for at least a portion of said output resistor.

11. In an electrical measuring instrument in accordance with claim 10 further characterized by the fact that the potential drop producing means includes a path of series connected glow discharge tubes and that the output indicating device includes a milliammeter and that the series resistance comprise at least two tube sections of relatively low resistance of the order of 1,000 ohms and 10,000 ohms selectively connectible in series therewith.

12. A current measuring device, comprising in combination, a high gain direct current amplifier having the output circuit thereof degeneratively connected with the input circuit thereof, whereby the input grid swing is negligible, a current responsive measuring instrument connected wtih the output circuit and responsive in accordance with the current gain between the input circuit and the output circuit, and means providing a ripple current filter in the amplifier connection between the input circuit and the output circuit.

13. A microammeter, including in combination a direct current amplifier having a plurality of high gain electric discharge devices connected in cascade relation between an input circuit and an output circuit, means providing a degenerative connection between the input circuit and the output circuit, means for adjusting the impedance ratio of the input circuit to the output circuit whereby a predetermined current amplification is obtained, a current responsive measuring device connected in said output circuit to indicate the current gain as a measure of the current in the input circuit, and means for filtering the current delivered to said output circuit whereby the amplifier is stabilized.

14. In an electrical measuring instrument, the combination of a direct current amplifier having an input circuit and an output circuit, means for degeneratively coupling the output circuit with said input circuit whereby said amplifier is stabilized at a predetermined potential on the input circuit, means in said amplifier providing a relatively high gain therethrough in the absence of said degenerative connection, means for adjusting the ratio of the input circuit impedance to the output circuit impedance to provide a predetermined current gain through said amplifier, a current responsive measuring device connected with the output circuit to provide a measurement of the current in said output circuit, and filter means for preventing ripple current through said amplifier.

15. A microammeter, including in combination a direct current amplifier having an input circuit and an output circuit, a plurality of high gain electric discharge devices connected in cascade relation between said input circuit and said output circuit, means providing a degenerative connection between the input circuit and the output circuit, means for adjusting the impedance ratio of the input circuit to the output circuit whereby a predetermined current amplification is obtained, a current responsive measuring device connected in said output circuit and calibrated to measure the current in the input circuit, and means for adjusting the impedance of the output circuit in predetermined relation to the impedance of the input circuit whereby the range of operation of said current responsive device is adjusted.

16. A microammeter in accordance with claim 15, further characterized by the fact that a controllable oscillator is inserted between the direct current amplifier and the output circuit in connection with and controlled by said amplifier, and that a rectifier for the oscillator output is provided in connection with the output circuit, said recifier having an output impedance and a shunt filter capacitor of relatively high capacity.

17. In an electrical measuring instrument, the combination of a direct current amplifier having an input circuit and an output circuit, means for degeneratively coupling the output circuit with said input circuit whereby said amplifier is stabilized at a predetermined potential on the input circuit, means in said amplifier providing a relatively high gain therethrough in the absence of said degenerative connection, means for adjusting the ratio of the input circuit impedance to the output circuit impedance to provide a predetermined current gain through said amplifier, a current responsive measuring device connected with the output circuit to provide a measurement of the current in said output circuit in accordance with the current gain therein.

18. A voltage measuring device, comprising in combination a plurality of thermionic devices direct-connected in cascade, a resistor connected in series in the output circuit of the last device in cascade, means for degeneratively connecting said resistor in the input circuit of the first of said devices in cascade, and an electrical meter connected with said resistor for providing a measurement of the voltage impressed on the input circuit.

19. A voltage and current measuring system, comprising an odd number of thermionic devices direct-connected in cascade, said thermionic devices each comprising a cathode, control electrode and anode, a resistor connected in series in the anode circuit of the last of said thermionic devices and in a connection between the cathode thereof and ground, means for degeneratively connecting the input circuit of the first of said devices with said resistor comprising a connection from the cathode thereof to said resistor, and a meter connected in circuit with said resistor for measuring the voltage or current in the input of said first device.

20. A voltage and current measuring system, comprising a plurality of thermionic devices in cascade, each including a cathode, control electrode and anode, a resistor connected in series in the space current path of the last of said devices, said resistor being connected degeneratively between ground and the cathodes of said first and last thermionic devices, and a meter connected across said resistor for measuring current or voltage in the input of said system.

21. In an electrical measuring instrument, the combination of an amplifier having an input circuit and an output circuit, means for degeneratively coupling the output circuit with said input circuit whereby said amplifier is locked in at a predetermined potential on the input circuit, means in said amplifier providing a predetermined gain therethrough in the absence of said degenerative connection, means for adjusting the ratio of the input circuit impedance to the output circuit impedance to provide a predetermined voltage gain through said amplifier, and a current responsive measuring device connected with the output circuit to provide a measurement of the voltage in said output circuit in accordance with the voltage gain therein.

ARTHUR W. VANCE.